United States Patent
Grey

[11] 3,924,934
[45] Dec. 9, 1975

[54] COMPACT SEVEN ELEMENT ZOOM LENS WITH MECHANICAL COMPENSATION

[75] Inventor: David S. Grey, Lexington, Mass.

[73] Assignee: Polaroid Corp., Cambridge, Mass.

[22] Filed: Dec. 26, 1972

[21] Appl. No.: 318,225

[52] U.S. Cl. .................................. 350/184; 350/214
[51] Int. Cl. ............................................ G02b 15/16
[58] Field of Search ..................... 350/184, 186, 214

[56] References Cited
UNITED STATES PATENTS

| | | | |
|---|---|---|---|
| 2,165,341 | 7/1939 | Capstaff et al. | 350/184 X |
| 3,603,669 | 9/1971 | Lai et al. | 350/186 |
| 3,609,006 | 9/1971 | Pospisil | 350/184 |
| 3,771,853 | 11/1973 | Nakamura | 350/184 |

Primary Examiner—John K. Corbin
Attorney, Agent, or Firm—Frederick H. Brustman, John W. Ericson

[57] ABSTRACT

A compact seven lens element zoom lens is described. It comprises a zoom group of four lens elements followed by an objective group of three lens elements. The zoom group, contrary to the common prior practice, is not afocal and thus directs a convergent bundle of light rays into the objective group. This novel arrangement promotes a high degree of corrections for aberrations otherwise present in a compact zoom lens of seven lens elements. Mechanical compensation of the air space between the third and the fourth lens elements retains the zoom lens' focal plane a predetermined distance behind the last lens element during zooming.

14 Claims, 3 Drawing Figures

| ELEMENT | N | ν | RADIUS | THICKNESSES | SEPARATION |
|---|---|---|---|---|---|
| I | 1.482 | 70.2 | $R_1 = -2.303$<br>$R_2 = 3.195$ | $t_1 = 0.100$ | $S_1 = 1.515$ |
| II | 1.700 | 54.5 | $R_3 = 3.652$<br>$R_4 = -2.440$ | $t_2 = 0.212$ | $S_2 = 0.000$ |
| III | 1.700 | 54.78 | $R_5 = 1.575$<br>$R_6 = -24.788$ | $t_3 = 0.212$ | $S_3 = 0.076$ |
| IV | 1.776 | 26.6 | $R_7 = -4.701$<br>$R_8 = 1.844$ | $t_4 = 0.800$ | $S_4 = 0.107$ |
| V | 1.691 | 54.7 | $R_9 = 0.628$<br>$R_{10} = 1.521$ | $t_5 = 0.175$ | $S_5 = 0.264$ |
| VI | 1.656 | 33.8 | $R_{11} = -9.809$<br>$R_{12} = 0.377$ | $t_6 = 0.206$ | $S_6 = 0.071$ |
| VII | 1.691 | 54.7 | $R_{13} = 0.531$<br>$R_{14} = -2.869$ | $t_7 = 0.336$ | $S_7 = 0.441$ |

| EFL | $S_3$ | $S_4$ |
|---|---|---|
| 0.995 | 0.075 | 0.098 |
| 1.122 | 0.084 | 0.341 |
| 1.254 | 0.098 | 0.553 |
| 1.414 | 0.120 | 0.768 |
| 1.595 | 0.148 | 0.965 |
| 1.749 | 0.175 | 1.104 |
| 1.883 | 0.200 | 1.207 |
| 2.047 | 0.232 | 1.314 |
| 2.245 | 0.273 | 1.420 |

COMPACT SEVEN ELEMENT ZOOM LENS WITH MECHANICAL COMPENSATION

BACKGROUND OF THE INVENTION

The present invention concerns the construction of an improved variable focal length objective lens of the type whose focal plane remains stationary or moves only within the limits defined by the objective lens' depth of focus as its focal length changes. Such variable focal length objectives are usually referred to as zoom lenses. Zoom lenses fall into one of two broad classes according to the compensating means employed for keeping the focal plane stationary while the focal length changes. The two classes are mechanical compensation to prevent focal plane shift and optical compensation to prevent it.

This invention relates to the class of mechanically compensated zoom lenses, whereas the invention disclosed in my copending patent application Ser. No. 318,226 filed Dec. 26, 1972 relates to the class of optically compensated zoom lenses. Mechanically compensated zoom lenses have two or more lens components that move axially relative to other lens components to change the focal length of the entire zoom lens. One or more of the movable lens components will have a non-linear motion to provide the required compensation to hold the focal plane stationary. The non-linear movable lens components will move at a different rate with respect to the fixed components of the zoom lens than the linearly movable lens components when the latter move (zoom) to change the focal length. This differential movement of the lens components requires a relatively complex mechanical construction of high precision. Most frequently cams linking the movable lens components provide the differential control of motion required to compensate for focal plane shift otherwise experienced during zoom. Mechanical compensation for focal plane shift during zoom simplifies somewhat the optical design of the zoom lens, reducing its axial size and making extra parameters available that can be used for control of optical aberrations.

Zoom lenses are generally designed in two separate parts to be used together. The front part is an afocal telescope of variable power, and the rear part is an objective lens of fixed power. An afocal telescope forms an image of a distant object at infinity. One advantage of this common arrangement is that the objective is corrected for objects at infinity and, therefore, can employ a variety of different afocal telescope front parts or it can function alone as a normal (non-zoom) objective.

To retain the image formed by the zoom lens in a fixed focal plane for all object distances, requires that the image formed by the first lens component always occupies the same position in space. Achieving this condition requires movement of the first lens component to focus the zoom lens in addition to any movement that lens might have for focal length variation. However, moving the first lens component only for focusing and not for zooming simplifies the mechanical and optical design of the zoom lens.

An object of the present invention is a compact well-corrected seven element zoom lens with an overall length four times its shortest focal length or less.

Another object of the present invention is a compact zoom lens with mechanical compensation for maintaining its focal plane stationary as its focal length varies.

Yet another object of the present invention is a compact zoom lens comprising a variable power telescope section for forming a stationary image at a finite distance and a fixed power objective lens section optically corrected for forming, at a finite conjugate, a real image of the stationary image.

SUMMARY OF THE INVENTION

These and other objects of the invention are accomplished by a seven element mechanically compensated zoom lens. It comprises a four lens component zoom group and a three lens component objective group. The zoom group forms a real image of a subject a finite distance to its rear, thereby providing convergent light to the objective group. The first lens component of the zoom group remains stationary during zooming. By itself it forms a virtual image of the subject and it moves only to focus the real image formed by the zoom group as a whole. The second, third, and fourth lens components move axially to vary the focal length of the zoom group. The zoom group's principal plane shifts forward and its power decreases, thereby increasing its focal length, as they approach the first lens component. Mechanical means, for example, cams, cause the fourth lens component to approach or recede from the first lens component at a predetermined rate different from that of the second and third lens components to compensate for the focal plane shift otherwise experienced during zoom. A low Abbe number for the fourth lens component promotes achromatization of the zoom group.

The objective group, comprising the fifth, sixth, and seventh lens elements, focuses the finite image formed by the zoom group onto the focal plane. It also corrects the aberrations present in that image.

It is important to note that the artificial constraint, common to the prior art, of having parallel light between the zoom and objective groups is avoided. Indeed, an important concept of this invention is that the lens components are treated as a unitary optical system and are not artificially resolved into an afocal zoom group and an infinity focused objective group. That type of terminology is used herein only as an aid to understanding the present invention for those familiar with the prior art.

DESCRIPTION OF THE DRAWINGS

Other objects and many of the attendant advantages of the present invention will be better appreciated and said invention will become more clearly understood by reference to the following detailed description when considered in conjunction with the accompanying drawing illustrating one embodiment of the instant invention, wherein.

THE PREFERRED EMBODIMENT

Figures 1, 2, 3:
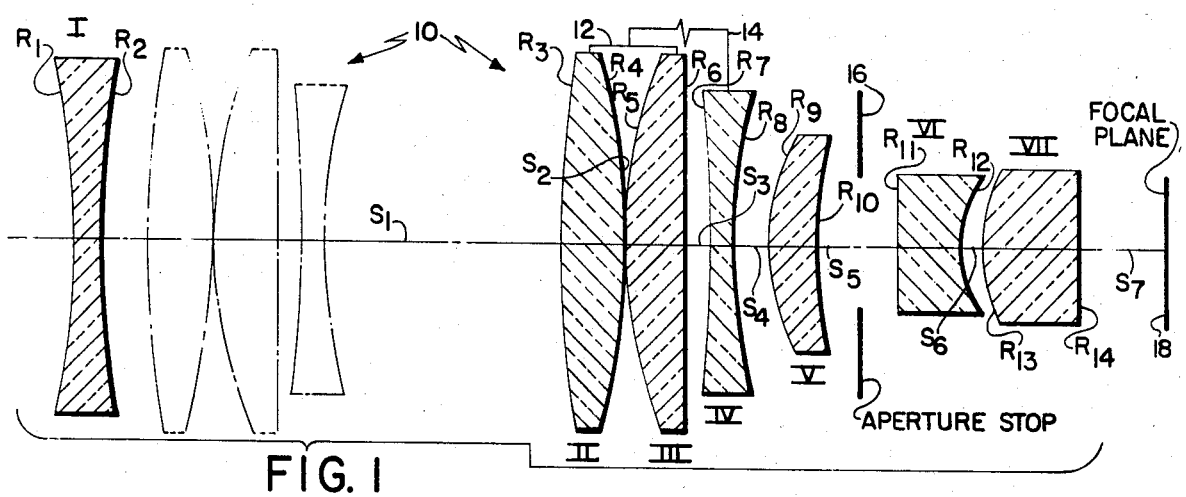
FIG. 1 illustrates a seven element mechanically compensated zoom lens according to the present invention.
FIG. 2 presents a tabulation of the numerical data necessary to construct the zoom lens illustrated in FIG. 1.
FIG. 3 presents a tabulation of the several values of the third air space, $S_3$, and the corresponding values of the fourth air space, $S_4$, with respect to the magnification ratio (EFL/F).

Refer to FIG. 1, showing one specie of the present invention, in conjunction with the following description. FIG. 1 shows a seven component mechanically compensated zoom lens 10 with its movable lens components II, III, and IV arranged to yield the shortest focal length (wide angle configuration). Moving lens components II, III, and IV leftwardly increases the focal length of the zoom lens 10. The maximum focal length (telephoto configuration) is achieved with the moving components in their leftwardmost position, indicated in the drawing by the phantom lines.

The first lens component moves axially to focus the zoom lens. In the position illustrated, it focuses the zoom lens 10 on a subject at infinity. Left-ward movement of the first lens component focuses the zoom lens 10 on closer subjects at finite conjugates. Its motion does not effectively change the focal length of the zoom lens 10.

The second and third lens components, II an III, move as a unit held together in a cell, symbolized in FIG. 1 by the solid link 12. The fourth lens component, IV, moves in response to movement of the second and third lens components, II and III, but at a different rate. The zig-zag link 14 symbolizes this. In the absence of the fourth lens component, IV, or in the case of it being fixed to the second and third lens components, II and III, the focused image would deviate from the required focal plane by more than the depth of focus as the focal length changed. The different movement rate of the fourth lens component stabilizes the location of the focused image at the focal plane, at least within the tolerance determined by the depth of focus. One can determine the rate of movement or location of the fourth lens component with respect to the second and third components, II and III, by assuming an axial position for the latter and calculating the axial position of the fourth lens component, IV, that yields the required result. This information is found in FIG. 3 and in a table infra.

The aperture stop 16 is located between the fifth lens component and the sixth lens component. This is the closest practical position for it to approximate a position at the center of the zoom lens 10. Clearly, a location for it further to the left would interfere with the operation of the moving lens components II, III, and IV of the zoom lens. Also, positioning the aperture stop 16 between the fourth and fifth lens components might lead to vignetting the transmitted light as the focal length of the zoom lens changes. Any position for the aperture stop 16 closer to the focal plane 18 would require an increase in the clear aperture (diameter) of the preceding lens components. The consequence of this would be adverse to achieving a well-corrected lens and increase the cost of the zoom lens.

The fifth, sixth, and seventh lens components have a net positive power and, therefore, form a real image. The parameters effecting their optical performance are selected to optimize the corrections for aberrations otherwise present in an image for fixed conjugates in its object and image spaces. The fixed conjugate in its image space is the focal plane 18 and the fixed conjugate in its object space is the position of the real image formed by the first four lens components, I, II, III, and IV.

The first four lens components, I, II, III, and IV, form a real image in their own image space that serves as the object for the last three lens components, V, VI, and VII. As noted above, the mechanical compensation of the zooming components maintains their image stationary. The parameters effecting the quality (aberration coefficients) of the real image they form are selected to produce the best useful image over the range of focal lengths independent of any corrections effected by the last three lens components, V, VI, and VII. One advantage gained from independently correcting the zoom and objective groups is a more practical tolerance for the assembly of the two lens groups into a complete zoom lens.

Because the present zoom section forms a real image at a finite conjugate, rather than at infinity as do afocal zoom sections, it has one less lens component than standard (afocal) zoom sections. Moreover, the rear objective section need not work as hard to correct the aberrations in the image it forms because it receives convergent light. Under some circumstances, the simplification permits a reduction of one lens component in the objective section without sacrificing the overall performance of the zoom lens. Any approach that obviates the need for another lens component promotes the compactness of the resulting zoom lens.

EXAMPLE I

Reference should be had now to both the zoom lens 10 illustrated in FIG. 1 and to its constructional data tabulated in FIG. 2. The constructional data of FIG. 2 is set forth below in terms of unit focal length, F, where the unit focal length, F, is the focal length for the values of $S_2$, $S_3$, and $S_4$ in the table for an $f/1.8$ aperture zoom lens.

| Element | $n_d$ | $\nu$ | Radius | Thicknesses | Separation |
|---|---|---|---|---|---|
| I | 1.482 | 70.2 | $R_1 = -2.303$<br>$R_2 = 3.195$ | $t_1 = 0.100$ | $S_1 = 1.515$ |
| II | 1.700 | 54.5 | $R_3 = 3.652$<br>$R_4 = -2.440$ | $t_2 = 0.212$ | $S_2 = 0.000$ |
| III | 1.700 | 54.78 | $R_5 = 1.575$<br>$R_6 = -24.788$ | $t_3 = 0.212$ | $S_3 = 0.076$ |
| IV | 1.776 | 26.6 | $R_7 = -4.701$<br>$R_8 = 1.844$ | $t_4 = 0.800$ | $S_4 = 0.107$ |
| V | 1.691 | 54.7 | $R_9 = 0.628$<br>$R_{10} = 1.521$ | $t_5 = 0.175$ | $S_5 = 0.264$ |
| VI | 1.656 | 33.8 | $R_{11} = -9.809$<br>$R_{12} = 0.377$ | $t_6 = 0.206$ | $S_6 = 0.071$ |
| VII | 1.691 | 54.7 | $R_{13} = 0.531$<br>$R_{14} = -2.869$ | $t_7 = 0.336$ | $S_7 = 0.441$ |

In both figures and the table above the Roman numerals I, II, III, etc., identify the lens elements in their respective order from the long conjugate (object) side to the short conjugate (film) side; $n_d$ represents the refractive index for a light wavelength of 587.6 nanometers; $\nu$ is the Abbe dispersion number; $R_1, R_2, \ldots$, represent the radii of the successive refractive surfaces in order from the long conjugate side to the short conjugate side; $t_2$ and $S_1$, etc., represent the thicknesses of the lens elements and air spaces, respectively, from the long conjugate side to the short conjugate side, $t_1$ being the thickness of the first lens element I, and $S_1$ being the thickness of the first air space between elements I and II. The air spaces $S_1$, $S_3$, and $S_4$ change during zooming, i.e., to alter the focal length while maintaining the focal plane in the proper location. Those illustrated and tabulated in FIG. 2 and also above represent the air spaces for this zoom lens' shortest focal length, F, i.e., the wide angle configuration of the lens components II, III, and IV with respect to the others. The relation of the air space $S_3$ to the air space $S_4$ is tabulated in FIG. 3 with respect to the magnification ratio (EFL/F) resulting from the change in focal length as the components II, III, and IV move forward. The table is set forth here:

| EFL/F | $S_3$ | $S_4$ |
|---|---|---|
| 0.995 | 0.075 | 0.098 |
| 1.122 | 0.084 | 0.341 |
| 1.254 | 0.098 | 0.553 |
| 1.414 | 0.120 | 0.768 |
| 1.595 | 0.148 | 0.965 |
| 1.749 | 0.175 | 1.104 |
| 1.883 | 0.200 | 1.207 |
| 2.047 | 0.232 | 1.314 |
| 2.245 | 0.273 | 1.420 |

One skilled in the art of zoom lenses could determine the information set out in the table from the zoom lens formula (FIG. 2) alone.

The table presents sufficient information to permit the design of a mechanism, for incorporation into a zoom lens cell, that will automatically affect the necessary changes to $S_3$ in response to changes by an operator to $S_4$ that alter the zoom lens 10's focal length.

EXAMPLE II

The following table contains the constructional data for another exemplary mechanical zoom lens according to the present invention. In Example II lens elements III and IV exhibit a pronounced rearward bending not found in Example I. Also, the last surface of the zoom lens described by Example II curves away from the focal plane more strongly than the last surface in Example I does. Lens element I as in Example I has a high Abbe number (70.2). In other respects, also, Example II adheres to the general principles of the invention as set out in the discussion of Example I.

| Element | $n_d$ | $\nu$ | Radius | Thicknesses | Separation |
|---|---|---|---|---|---|
| I | 1.482 | 70.2 | $R_1 = -8.383$<br>$R_2 = 1.709$ | $t_1 = 0.100$ | $S_1 = 1.537$ |
| II | 1.699 | 54.8 | $R_3 = 2.064$<br>$R_4 = -4.215$ | $t_2 = 0.213$ | $S_2 = 0.000$ |
| III | 1.696 | 55.0 | $R_5 = 0.917$<br>$R_6 = 4.060$ | $t_3 = 0.253$ | $S_3 = 0.084$ |
| IV | 1.725 | 29.0 | $R_7 = 12.586$<br>$R_8 = 0.709$ | $t_4 = 0.080$ | $S_4 = 0.161$ |
| V | 1.691 | 54.7 | $R_9 = 0.593$<br>$R_{10} = 1.461$ | $t_5 = 0.164$ | $S_5 = 0.090$ |
| VI | 1.642 | 34.7 | $R_{11} = -15.276$<br>$R_{12} = 0.392$ | $t_6 = 0.295$ | $S_6 = 0.058$ |
| VII | 1.691 | 54.7 | $R_{13} = 0.531$<br>$R_{14} = -2.036$ | $t_7 = 0.321$ | $S_7 = 0.445$ |

Lens component I has negative power and a large Abbe number. The large Abbe number minimizes the effect of the focusing movement of lens component I on the corrections for chromatic aberrations. Except for such considerations as economy and chemical stability, other glasses with larger Abbe numbers might have been selected.

In general, it has been found useful to select the highest practical value of refractive index for the positive lens components (II, III, V, and VII). This permits the use of weaker surface curvatures on those components, thereby not unduly exacerbating the contribution of each lens component to the total aberrations of the zoom lens. The glasses for the negative lens components are selected with primary consideration to their Abbe number in order to control the lateral and longitudinal chromatic aberrations otherwise encountered in a complex lens. In particular, a high index flint glass is chosen for the negative fourth component, IV, the last component of the zoom array, to take advantage of its low Abbe number (26.6) for achromatizing the zoom array independently of the remaining lens components.

In light of the foregoing discussion, it should be understood that the specific lens designs discussed above in detail are just preferred embodiments of the invention. Since changes may be made in the seven component mechanically compensated zoom lenses described above without departing from the scope of the invention herein involved, it is intended that all matter contained in the above description or shown in the accompanying drawing shall be interpreted as illustrative of the broad principles of this invention and not limiting on its scope.

What is claimed is:

1. A zoom lens the optical portion of which consists of, in an axially aligned arrangement from the long conjugate side to the short conjugate side:
    a negative first lens component;
    a positive second lens component;
    a positive third lens component with unequally curved surfaces, having its more strongly curved surface toward said long conjugate, adjacent and rigidly connected to said positive second component;
    a negative fourth lens component;
    a positive meniscus fifth lens component curved toward said short conjugate;

a negative sixth lens component, having a strong concave surface toward said short conjugate; and a positive seventh lens component, having a strong convex surface toward said long conjugate.

2. The zoom lens described in claim 1, wherein said negative first lens component is biconcave and said positive second lens component is biconvex.

3. The zoom lens described in claim 1, the mechanical portion of which includes:
   means for permitting said second, third, and fourth lens components to move axially from said fifth component toward said first component and to return; and
   compensating means for adjusting an air space between said third and fourth lens components in a predetermined manner with respect to the axial location of said second and third lens components between said first and said fifth lens components.

4. The zoom lens described in claim 1, wherein said first, second, third, and fourth lens components function as a zoom group to change the focal length of said zoom lens and said fifth, sixth, and seventh lens components function as an objective group, the lens powers of said zoom group selected so light emerging therefrom will be refracted to a focus at a finite distance behind said zoom group, and the powers and shapes of said objective group selected to correct the aberrations in said focused light entering said objective group.

5. The zoom lens described in claim 1, wherein said first, second, third, and fourth lens components function as a zoom group and wherein the last component of the zoom group has a low Abbe dispersion number.

6. The zoom lens described in claim 1, wherein the overall length of said zoom lens from its first refracting surface to its last refracting surface is less than four times its shortest focal length.

7. A zoom lens comprising in an axially aligned arrangement from its long conjugate subject side to its short conjugate film plane side:
   a negative first lens component, said first lens component movable axially for focusing said subject at said film plane;
   a first plurality of lens elements axially separated from said first lens component and axially movable so as to change its separation from said first lens component and thereby to change the focal length of said zoom lens, at least one lens of said first plurality of lens elements being axially movable with respect to the remainder of said first plurality of lens elements in a predetermined mannner so the focal plane of said zoom lens will remain at said film plane as said focal length changes, said first plurality of lens elements having a positive net refracting power greater than the negative refracting power of said first lens component; and
   stationary lens means for refracting onto said film plane a real image formed by the concerted action of said first lens component and said first plurality of lens elements at a conjugate point a finite distance from said second plurality of lens elements and for reducing the residual aberrations present in said real image as refracted onto said film plane, said zoom lens having an overall length from its first refracting surface to its last refracting surface less than four times its shortest focal length.

8. The zoom lens described in claim 7, wherein said first plurality of lens elements comprises from its long conjugate side to its short conjugate side:
   a biconvex positive lens element;
   a positive lens element with a strong refractive surface and a weak refractive surface, having its strong refractive surface toward said long conjugate side, separated from said biconvex positive lens element by a fixed distance; and
   an axially movable negative lens element, separated from said positive lens elements by an air space that can vary in a predetermined manner with respect to said separation, between said negative first lens component and said first plurality of lens elements, so the focal plane of said zoom lens will remain at said film plane as said separation changes.

9. The zoom lens described in claim 7, wherein said stationary lens means comprises from its long conjugate side to its short conjugate side:
   a meniscus positive fifth lens element being concave toward said short conjugate;
   a negative sixth lens element, having a strong concave surface toward said short conjugate; and
   a positive seventh lens element, having a strong convex surface toward said long conjugate, said fifth, sixth, and seventh lens elements being axially separated from each other.

10. The zoom lens described in claim 7, wherein said first plurality of lens elements comprises from its long conjugate side to its short conjugate side:
    a biconvex positive lens component;
    a positive lens component with a strong refractive surface and a weak refractive surface, having its strong refractive surface toward said long conjugate side, separated from said biconvex positive lens component by a fixed distance; and
    an axially movable negative lens component, separated from said positive lens components by an air space that can vary in a predetermined manner with respect to said separation, between said negative first lens component and said first plurality of lens components, so the focal plane of said zoom lens will remain at said film plane as said separation changes.

11. The zoom lens described in claim 7, wherein said stationary lens means comprises from its long conjugate side to its short conjugate side:
    a meniscus positive fifth lens component being concave toward said short conjugate;
    a negative sixth lens component, having a strong concave surface toward said short conjugate; and
    a positive seventh lens component, having a strong convex surface toward said long conjugate, said fifth, sixth, and seventh lens components being axially separated from each other.

12. A mechanically compensated seven element zoom objective lens having the design parameters for a unit focal length, F, represented in the following table:

| Element | $n_d$ | $\nu$ | Radius | Thicknesses | Separation |
|---|---|---|---|---|---|
| I | 1.482 | 70.2 | $R_1 = -2.303$ | $t_1 = 0.100$ | $S_1 = 1.515$ |
|  |  |  | $R_2 = 3.195$ |  |  |
| II | 1.700 | 54.5 | $R_3 = 3.652$ | $t_2 = 0.212$ | $S_2 = 0.000$ |
|  |  |  | $R_4 = -2.440$ |  |  |
| III | 1.700 | 54.78 | $R_5 = 1.575$ | $t_3 = 0.212$ | $S_3 = 0.076$ |
|  |  |  | $R_6 = -24.788$ |  |  |

| Element | $n_d$ | $\nu$ | Radius | Thicknesses | Separation |
|---|---|---|---|---|---|
| IV | 1.776 | 26.6 | $R_7 = -4.701$ $R_8 = 1.844$ | $t_4=0.800$ | $S_4=0.107$ |
| V | 1.691 | 54.7 | $R_9 = 0.628$ $R_{10} = 1.521$ | $t_5=0.175$ | $S_5=0.264$ |
| VI | 1.656 | 33.8 | $R_{11} = -9.809$ $R_{12} = 0.377$ | $t_6=0.206$ | $S_6=0.071$ |
| VII | 1.691 | 54.7 | $R_{13} = 0.531$ $R_{14} = -2.869$ | $t_7=0.336$ | $S_7=0.441$ | wherein F is the shortest focal length for the zoom objective lens, i.e., that for which the air spaces $S_1$ and $S_3$ are given; Roman numerals I, II, . . ., identify the respective lens elements from the long conjugate side to the short conjugate side; $n_d$ is the refractive index for a light wavelength of 587.6 nanometers; $\nu$ is the dispersion number; $R_1, R_2, \ldots$, represent the radii of the successive refractive surfaces from the long conjugate side to the short conjugate side; t and S represent thickness of lens elements and air spaces, respectively, from the long conjugate side to the short conjugate side, $S_4$ being variable to change the focal length of this zoom lens and $S_3$ varying with a predetermined relationship to $S_4$ to maintain the location of the focal plane.

13. A mechanically compensated seven element zoom objective lens having the design parameters for a unit focal length, F, represented in the following table:

| Element | $n_d$ | $\nu$ | Radius | Thicknesses | Separation |
|---|---|---|---|---|---|
| I | 1.482 | 70.2 | $R_1 = -8.383$ $R_2 = 1.709$ | $t_1=0.100$ | $S_1=1.537$ |
| II | 1.699 | 54.8 | $R_3 = 2.064$ $R_4 = -4.215$ | $t_2=0.213$ | $S_2=0.000$ |
| III | 1.696 | 55.0 | $R_5 = 0.917$ $R_6 = 4.060$ | $t_3=0.253$ | $S_3=0.084$ |
| IV | 1.725 | 29.0 | $R_7 = 12.586$ $R_8 = 0.709$ | $t_4=0.080$ | $S_4=0.161$ |
| V | 1.691 | 54.7 | $R_9 = 0.593$ $R_{10} = 1.461$ | $t_5=0.164$ | $S_5=0.090$ |
| VI | 1.642 | 34.7 | $R_{11} = -15.276$ $R_{12} = 0.392$ | $t_6=0.295$ | $S_6=0.058$ |
| VII | 1.691 | 54.7 | $R_{13} = 0.531$ $R_{14} = -2.036$ | $t_7=0.321$ | $S_7=0.445$ | wherein F is the shortest focal length for the zoom objective lens, i.e., that for which the air spaces $S_1$ and $S_3$ are given; Roman numerals I, II, . . ., identify the respective lens elements from the long conjugate side to the short conjugate side; $n_d$ is the refractive index for a light wavelength of 587.6 nanometers; $\nu$ is the dispersion number; $R_1, R_2, \ldots$, represent the radii of the successive refractive surfaces from the long conjugate side to the short conjugate side; t and S represent thickness of lens elements and air spaces, respectively, from the long conjugate side to the short conjugate side, $S_4$ being variable to change the focal length of this zoom lens and $S_3$ varying with a predetermined relationship to $S_4$ to maintain the location of the focal plane.

14. A zoom lens the optical portion of which consists of, in an axially aligned arrangement from its long conjugate subject side to its short conjugate film plane side:
  a negative first lens component, said first lens component movable axially for focusing said subject at said film plane;
  a first plurality of three lens components axially separated from said first lens component and axially movable so as to change its separation from said first lens component and thereby to change the focal length of said zoom lens, at least one lens component of said first plurality of lens components being axially movable with respect to the remainder of said first plurality of lens components in a predetermined manner so the focal plane of said zoom lens will remain at said film plane as said focal length changes, said first plurality of lens components having a positive net refracting power greater than the negative refracting power of said first lens component; and
  stationary lens means for refracting onto said film plane a real image formed by the concerted action of said first lens component and said first plurality of lens components at a conjugate point a finite distance from said second plurality of lens components and for reducing the residual aberrations present in said real image as refracted onto said film plane, said zoom lens having an overall length from its first refracting surface to its last refracting surface less than four times its shortest focal length.

* * * * *